(12) United States Patent
Miyajima et al.

(10) Patent No.: US 8,896,821 B2  
(45) Date of Patent: Nov. 25, 2014

(54) ENCODER

(71) Applicant: Sanyo Denki Co., Ltd., Tokyo (JP)

(72) Inventors: Tooru Miyajima, Tokyo (JP); Yoshi Ishizuka, Tokyo (JP); Shoji Ito, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 13/846,048

(22) Filed: Mar. 18, 2013

(65) Prior Publication Data

US 2013/0242289 A1 Sep. 19, 2013

(30) Foreign Application Priority Data

Mar. 19, 2012 (JP) .................. 2012-062693

(51) Int. Cl.
- *G01N 21/00* (2006.01)
- *G01D 5/347* (2006.01)
- *G01D 5/12* (2006.01)

(52) U.S. Cl.
CPC .......... *G01D 5/3473* (2013.01); *G01D 5/34792* (2013.01); *G01D 5/12* (2013.01)
USPC ........................................... 356/72

(58) Field of Classification Search
USPC ...................................... 356/72–73
See application file for complete search history.

(56) References Cited

U.S. PATENT DOCUMENTS 4,654,636 A * 3/1987 Rusk ............................... 341/13

FOREIGN PATENT DOCUMENTS

JP 2009294073 A 12/2009

* cited by examiner

*Primary Examiner* — Abdullahi Nur

(74) *Attorney, Agent, or Firm* — Novak Druce Connolly Bove + Quigg LLP

(57) ABSTRACT

To realize an encoder having highly reliable detection accuracy and capable of reducing a device cost. A light detection unit of an encoder receives light irradiated by a light source and transmitted through light-transmitting portions of Gray code optical patterns of a rotating disk and a light-transmitting/shielding member, and detects the light as digital data. A magnetic detection unit detects a magnetic pattern of a magnet provided on a rotation center portion of the rotating disk as digital data. A processing unit compares the digital data of the magnetic detection unit and the digital data of the light detection unit, and corrects a detection error.

8 Claims, 5 Drawing Sheets

ENCODER

CROSS-REFERENCE TO RELATED APPLICATION

This application claims priority to Japanese Application No. 2012-062693, filed Mar. 19, 2012, the entirety of which is incorporated herein by reference.

BACKGROUND

1. Technical Field

The present invention relates to an encoder that converts amount of mechanical displacement of a rotating object to be measured into an electrical signal, processes the signal, and detects a rotation angle and a rotation speed.

2. Description of Related Arts

Encoders have been known as a device to detect a rotation angle (rotation position) and a rotation speed of a rotating object to be measured such as a servo motor.

A typical encoder includes a rotating disk connected to a rotation axis of a rotating object to be measured, and a light-emitting device and a light-receiving device that sandwich the rotating disk to face each other. An optical pattern having a light-transmitting portion and a light-shielding portion is formed on the rotating disk according to a predetermined rule.

Light emitted from the light-emitting device is shielded by the light-shielding portion of the optical pattern on the rotating disk, or is transmitted through the light-transmitting portion and is received by the light-receiving device. Timing of receiving light by the light-receiving device depends on the optical pattern. Therefore, a rotation angle of the rotating disk can be detected by measuring the light-receiving timing as an electrical signal.

A plurality of tracks is configured such that the optical pattern appearing in one rotation of the rotating disk has different cycles, so that detection accuracy of the rotation angle can be enhanced. The more the detection accuracy is enhanced, the larger the number of tracks is, and the rotating disk also becomes larger. This cannot meet the need of products that require downsizing, such as a motor.

So, as a technology to reduce the number of tracks and to downsize the rotating disk, an encoder is disclosed, in which a magnet is attached to a rotation axis along with a rotating disk having an optical pattern (For example, see Japanese Patent Application Laid-Open No. 2009-294073). This encoder identifies a rotation angle with certain accuracy by detecting a magnetic pattern of the magnet, and further enhances the detection accuracy of the rotation angle by combining the magnetic pattern with the optical pattern.

By the way, the encoder disclosed in Japanese Patent Application Laid-Open No. 2009-294073 detects both of the optical pattern and the magnetic pattern as analog data of a sine wave or a cosine wave. If all of the detection data are analog data, all of the detection data need to be subjected to analog-digital conversion and signal processing. Therefore, the encoder is required to be provided with a plurality of analog-digital conversion circuits for the optical pattern and the magnetic pattern individually, and this results in an increase of a device cost.

SUMMARY

The present invention has been made in view of the foregoing, and an object of the present invention is to provide an encoder having highly reliable detection accuracy and capable of reducing a device cost.

An encoder to achieve the above-described object includes a rotating disk, a light-transmitting/shielding member, a light source, a light detection unit, a magnet, a magnetic detection unit, and a processing unit.

A plurality of Gray code optical patterns is formed on the rotating disk in a radial direction, which has a light-transmitting portion and a light-shielding portion alternately in a rotation direction.

An optical pattern having a light-transmitting portion and a light-shielding portion, and facing each Gray code optical pattern on the rotating disk is formed on the light-transmitting/shielding member.

The light source irradiates the Gray code optical patterns on the rotating disk and the optical pattern on the light-transmitting/shielding member with light.

The light detection unit receives the light transmitted through the light-transmitting portions on the rotating disk and on the light-transmitting/shielding member, and outputs digital data in accordance with a rotation position of the rotating disk.

The magnet is provided on a rotation center portion of the rotating disk, and forms a magnetic pattern with an arrangement of magnetic poles.

The magnetic detection unit detects the magnetic pattern, and outputs digital data in accordance with the rotation position of the rotating disk.

The processing unit obtains a rotation angle of the rotating disk using the digital data of the magnetic detection unit and the light detection unit.

According to the encoder of the present invention, the processing unit obtains the rotation angle of the rotating disk using the digital data of the magnetic detection unit and the light detection unit. Therefore, reliability of detection accuracy is high.

Further, since the Gray code optical patterns and the binary code magnetic pattern provided on the rotating disk are detected as digital data, the number of analog-digital conversion circuits can be substantially decreased, and the device cost of the encoder can be reduced.

DETAILED DESCRIPTION

Hereinafter, an embodiment of an encoder according to the present invention will be described with reference to the drawings.

Figure 1:
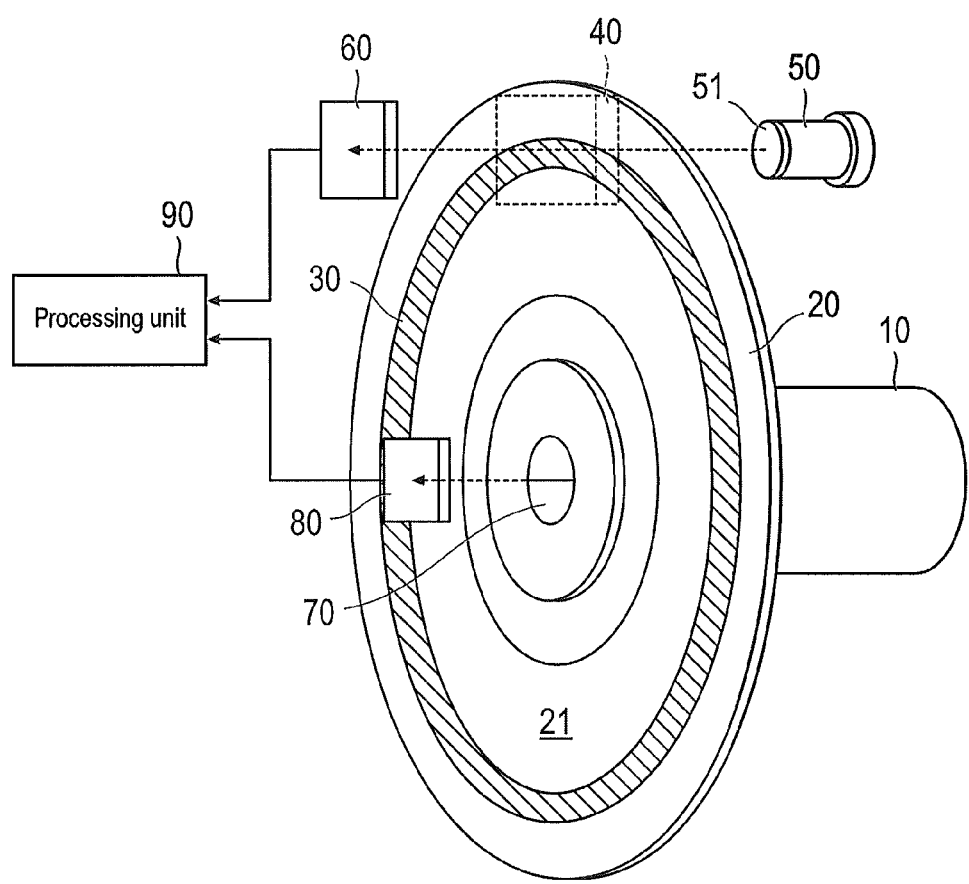
FIG. 1 is a schematic perspective view illustrating a configuration of an embodiment of an encoder according to the present invention.
Figure 2:
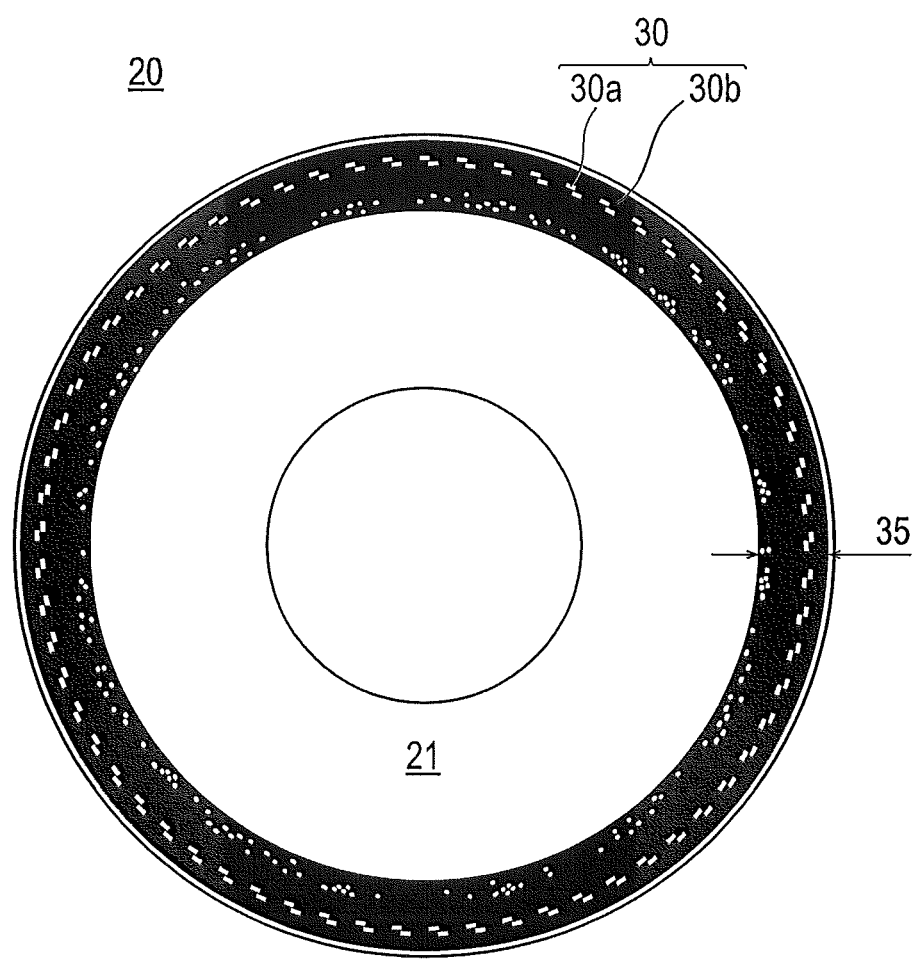
FIG. 2 is a plan view illustrating a rotating disk in the encoder of the present embodiment.
Figure 3:
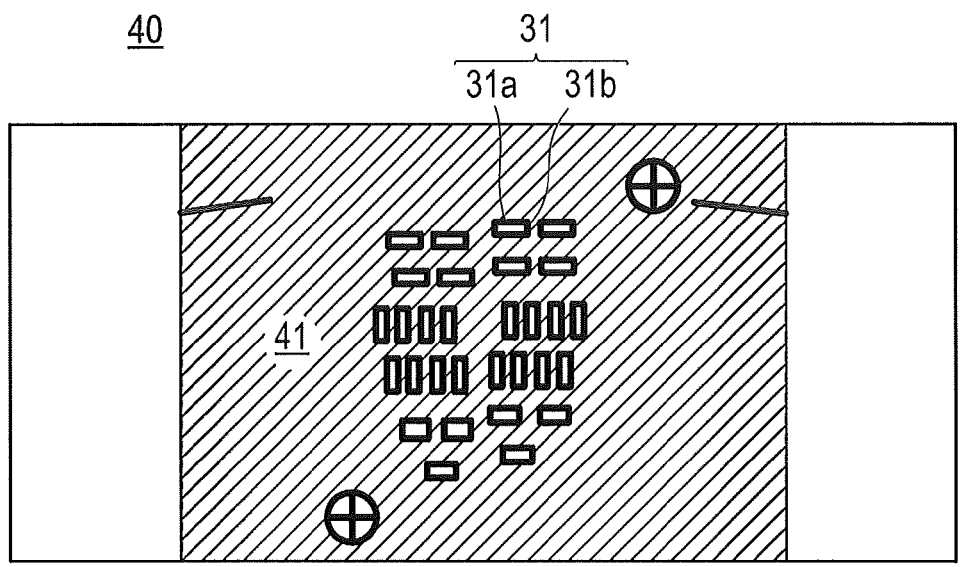
FIG. 3 is a plan view illustrating a fixed mask in the encoder of the present embodiment.

A configuration of an encoder of the present embodiment will be described with reference to FIGS. 1 to 3. FIG. 1 is a schematic perspective view illustrating a configuration of an embodiment of an encoder according to the present invention, FIG. 2 is a plan view illustrating a rotating disk in the encoder of the present embodiment, and FIG. 3 is a plan view illustrating a fixed mask in the encoder of the present embodiment.

[A Configuration of an Encoder]

An encoder 100 of the present embodiment is a transmission type encoder that receives, by a light detection unit 60, light irradiated by a light source 50 and transmitted through an optical pattern 30 on a rotating disk 20 and a light-transmitting/shielding member 40, and detects the light as digital data. Further, the encoder 100 of the present embodiment detects a magnetic pattern of a magnet 70 provided on a rotation center of the rotating disk 20 as digital data by a magnetic detection unit 80. Further, a processing unit 90 corrects the digital data of the magnetic detection unit 80 based on the digital data of the light detection unit 60, whereby the encoder 100 having good detection accuracy can be provided.

The encoder 100 of the present embodiment includes, as illustrated in FIG. 1, the light-transmitting/shielding member 40, the light source 50, the light detection unit 60, the magnet 70, the magnetic detection unit 80, and the processing unit 90 other than the rotating disk 20 connected to a rotating object to be measured (not illustrated).

An example of the object to be measured of the encoder 100 of the present embodiment includes a rotation-controllable motor such as a servo motor. The performance of positioning, a speed, and the like of the servo motor are determined according to the resolution and the detection accuracy of a rotation angle. Therefore, it is fair to say that the performance of a servo system is determined according to the performance of the encoder 100.

The rotating disk 20 is a disk member attached to a rotation axis 10 of the object to be measured so as to be integrally rotated with the rotation axis 10. The rotating disk 20 is fixed to the rotation axis 10 such that the rotation center of the rotating disk 20 is concentric to the rotation axis 10 of the object to be measured, and a disk surface 21 is perpendicular to an axial direction of the rotation axis 10.

The rotating disk 20 of the present embodiment is formed of a light-transmitting member. For example, clear glass or clear synthetic resin such as polycarbonate is used.

In the vicinity of a periphery of the disk surface 21 of the rotating disk 20, as illustrated in FIGS. 1 and 2, the optical pattern 30 is formed, in which a light-transmitting portion 30a and a light-shielding portion 30b are alternately arranged along a rotation direction of the rotating disk 20. The light-transmitting portion 30a and the light-shielding portion 30b of the optical pattern 30 are formed by covering the disk surface 21 of the rotating disk 20, which is formed of a light-transmitting member, with a light-absorbing or light-reflecting light-shielding film. That is, a portion to be the light-shielding portion 30b except a portion to be the light-transmitting portion 30a on the disk surface 21 of the rotating disk 20 is covered with the light-shielding film. Note that, in FIG. 2, a white portion of the optical pattern 30 serves as the light-transmitting portion 30a, and a black portion between the light-transmitting portions 30a serves as the light-shielding portion 30b.

The optical pattern 30 of the present embodiment is formed of Gray code optical patterns. Here, a Gray code is an n-bit numeric code having a property in which it changes by one bit as one step proceeds, and is digital data that can be easily binary-converted.

The Gray code optical patterns are formed throughout a plurality of tracks 35 in a radial direction of the rotating disk 20. A cycle of one rotation of the Gray code optical pattern in each track 35 is different. The optical pattern 30 of the present embodiment has the Gray codes of 64A, 64B, 512A, 256A, and 128A/rotation set in the radial direction of the rotating disk 20 from outside, for example. The optical pattern 30 is not limited to be above-described pattern of 64A, 64B, 128A, 256A, and 512A/rotation, and may be, for example, set to be other Gray code patterns such as 128A, 128B, 256A, 512A, and 1024A/rotation.

The light-transmitting/shielding member 40 of the present embodiment is formed as a fixed mask provided between the light source 50 and the rotating disk 20. The fixed mask 40 is a rectangular or fan-shaped plate member, and is provided such that a mask surface 41 faces the disk surface 21 of the rotating disk 20 with a space. The fixed mask 40 has an optical pattern 31 facing each of the Gray code optical patterns of the plurality of tracks 35 of the rotating disk 20, as illustrated in FIG. 3.

The optical pattern 31 of the fixed mask 40 is formed corresponding to each of the Gray code optical patterns at the side of the rotating disk. While the fixed mask 40 is a fixed mask, the rotating disk 20 is rotated with the rotation axis 10. Therefore, the light-transmitting portions 30a and 31a of the optical pattern 30 at the side of the rotating disk and the optical pattern 31 at the side of the fixed mask are opened/closed associated with the rotation of the rotating disk 20. Therefore, the light detection unit 60 described below receives the light transmitted through the opening/closing light-transmitting portions 30a and 31a, and outputs sine-wave analog data.

The optical pattern 31 at the side of the fixed mask includes the light-transmitting portion 31a and the light-shielding portion 31b alternately, similar to the optical pattern 30 at the side of the rotating disk. The fixed mask 40 is, similar to the rotating disk 20, formed of a light-transmitting member such as clear glass and clear synthetic resin, and the light-transmitting portion 31a and the light-shielding portion 31b are formed by covering the mask surface 41 with a light-shielding film.

The light source 50 and the light detection unit 60 are provided to sandwich the rotating disk 20 and the fixed mask 40, and to face each other.

The light source 50 irradiates the optical pattern 31 of the fixed mask 40 and the optical pattern 30 of the rotating disk 20 with light. As the light source 50, a light-emitting device such as a light emitting diode (LED) and a laser diode (LD) is used, for example. To accurately detect the optical patterns 30 and 31, it is favorable to form parallel light by arranging a lens 51 anteriorly in an irradiation direction of the light source 50.

The light detection unit 60 is a device to receive the light irradiated by the light source 50 and transmitted through the light-transmitting portions 30a and 31a of the optical patterns 30 and 31 of the rotating disk 20 and the fixed mask 40. The light detection unit 60 measures a light-receiving timing of the light transmitted through the light-transmitting portions 30a and 31a of the optical patterns 30 and 31 as an electrical signal. The light-receiving timing differs depending on the optical patterns 30 and 31. As the light detection unit 60, a light-receiving device such as a photodiode (PD) and a photo IC is used, for example.

The light detection unit 60 is provided with a light receiving unit A/B (not illustrated) formed of the same member but divided. The light detection unit 60 receives the light transmitted through the light-transmitting portions 30a and 31a of the Gray code optical patterns of the rotating disk 20 and the fixed mask 40 during rotation of the rotating disk 20, and in the present embodiment, outputs digital data of the Gray codes of 64A, 64B, 128A, 256A, and 512A/rotation.

Further, the light detection unit 60 receives the light transmitted through the light-transmitting portions 30a and 31a of the rotating disk 20 and the fixed mask 40 during rotation of the rotating disk 20, and, in the present embodiment, outputs analog data of 512A and 512B/rotation. Although, in the present embodiment, sine-wave analog data of 512A and 512B/rotation is output, it is not limited to the above embodiment. The light detection unit 60 may output other sine-wave analog data such as 1024A and 1024B/rotation.

The magnet 70 is provided on the rotation center portion of the rotating disk 20. The magnet 70 constitutes a predetermined magnetic pattern with an S magnetic pole and an N magnetic pole. The magnet 70 of the present embodiment constitutes a binary code magnetic pattern.

The magnetic detection unit 80 is a sensor to read out the magnetic pattern of the magnet 70. The magnetic detection unit 80 is arranged to face the magnet 70 with a space in an axial direction of the rotation axis 10. As the magnetic detection unit 80, a magnetic detection device such as a Hall effect sensor and a Fluxgate Sensor is used, for example. The magnetic detection unit 80 reads out the magnetic pattern and outputs digital data. As the magnetic detection unit 80 of the present embodiment, a magnetic detection device of 12 bits/rotation is used, for example.

The processing unit 90 is a processing unit to process detection data output from the light detection unit 60 and the magnetic detection unit 80. Therefore, the processing unit 90 is electrically connected with the light detection unit 60 and the magnetic detection unit 80. An analog data output unit of the light detection unit 60 is electrically connected with the processing unit 90 via an analog-digital conversion circuit (not illustrated).

The processing unit 90 is provided with a first electronic counter 91 used for processing digital data of the Gray code optical patterns and a second electronic counter 92 used for processing digital data of the magnetic pattern (see FIG. 4 described below). The processing unit 90 obtains a rotation angle and a rotation speed of the rotating disk 20 by processing detection data of the light detection unit 60 and the magnetic detection unit 80, and identifies a rotation angle and a rotation speed of an object to be measured.

That is, the processing unit 90 corrects digital data of a binary code output from the magnetic detection unit 80 based on digital data of a Gray code output from the light detection unit 60. Further, the processing unit 90 refers to sine-wave analog data output from the light detection unit 60 to correct a detection error of the digital data of the Gray code output from the light detection unit 60, and obtains the rotation angle of the rotating disk 20.

Although the processing unit 90 obtains the rotation speed of the rotating disk 20 by performing carry/borrow determination based on the sine-wave analog data of 512A and 512B/rotation, the processing unit 90 may obtain the rotation speed of the rotating disk 20 by counting one rotation data of the magnetic detection unit 80. Note that the detail of the data processing by the processing unit 90 will be described below.

[An Operation of the Encoder]

Referring back to FIG. 1, an operation of the encoder 100 of the present embodiment will be described.

When an object to be measured such as a servo motor rotates, the rotating disk 20 is rotated with the rotation axis 10. Then, the fixed mask 40 and the rotating disk 20 are irradiated with parallel light by the light source 50. The light irradiated with the light source 50 and transmitted through the light-transmitting portions 30a and 31a of the optical pattern 31 of the fixed mask 40 and the optical pattern 30 of the rotating disk 20 is received by the light detection unit 60.

The light detection unit 60 receives the irradiated light transmitted through the light-transmitting portions 30a and 31a of the Gray code optical patterns of the fixed mask 40 and the rotating disk 20, and outputs digital data of a Gray code. Along with the above, the light detection unit 60 receives the irradiated light transmitted through the light-transmitting portions 30a and 31a of the fixed mask 40 and the rotating disk 20, and outputs sine-wave analog data.

Further, when rotation of the object to be measured is started, the magnetic detection unit 80 reads out the magnetic pattern of the magnet 70 provided on the rotation center portion of the rotating disk 20, and outputs digital data of a binary code.

The processing unit 90 processes detection data output from the light detection unit 60 and the magnetic detection unit 80 to obtain a rotation angle and a rotation speed of the rotating disk 20, and identifies a rotation angle and a rotation speed of the object to be measured 10.

Here, a data processing procedure in the processing unit 90 will be described with reference to FIG. 4. FIG. 4 is a block diagram illustrating a data processing procedure in the processing unit of the present embodiment.

The processing unit 90 can obtain the rotation speed of the rotating disk 20 by counting one rotation data of the magnetic detection unit 80.

Figure 4:
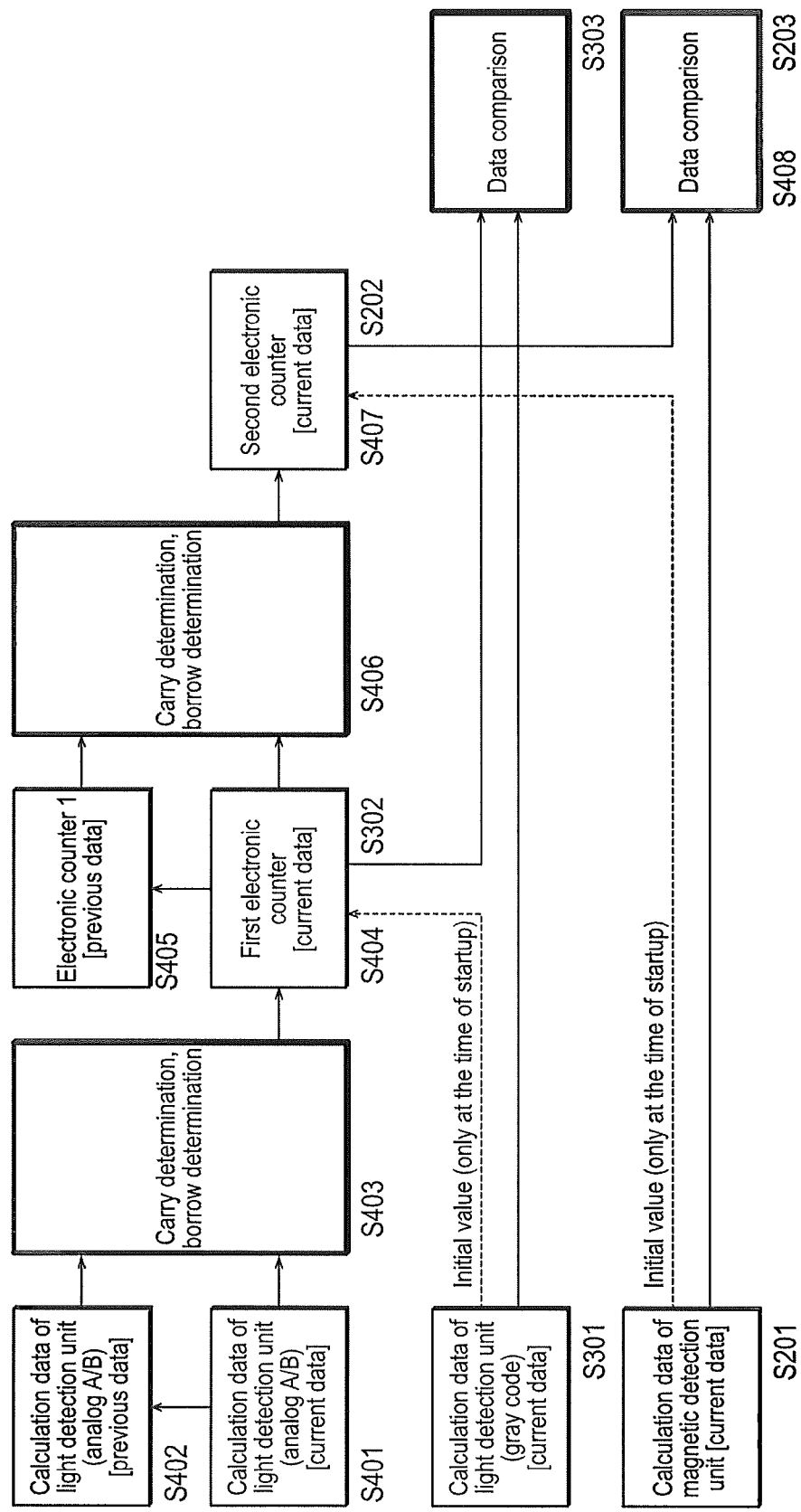
FIG. 4 is a block diagram illustrating a data processing procedure in a processing unit of the present embodiment.

As illustrated in FIG. 4, the processing unit 90 calculates digital data of the magnetic detection unit 80 (S201). At the time of startup, an initial value of the calculation data of the magnetic detection unit 80 is set to the second electronic counter 92 (only at the time of startup), and the second electronic counter 92 holds the initial value (S202).

Then, the processing unit 90 detects whether there is an error by comparing calculation data of the second and subsequent rotations of the magnetic detection unit 80 with the value in the second electronic counter 92 (S203).

Further, the processing unit 90 calculates Gray code digital data of the light detection unit 60 (S301). At the time of startup, an initial value of the Gray code calculation data of the light detection unit 60 is set to the first electronic counter 91 (only at the time of startup), and the first electronic counter 91 holds the initial value (S302).

Then, the processing unit 90 detects whether there is an error by comparing Gray code calculation data of the light detection unit 60 during rotation of the rotating disk 20 with the value in the first electronic counter 91 (S303).

The processing unit 90 calculates sine-wave analog data A/B of the light detection unit 60 during rotation of the rotating disk 20 (S401). The processing unit 90 compares previous data and current data in the sine-wave analog data A/B (S402), and performs carry determination or borrow determination (S403). A determination result is input to the first electronic counter 91 (S404).

The processing unit 90 compares previous data and current data in the first electronic counter 91 (S405), and performs carry determination or borrow determination (S406). A determination result is input to the second electronic counter 92 (S407).

The processing unit 90 can obtain the rotation speed of the rotating disk 20 by performing carry determination or borrow determination based on the sine-wave analog data A/B. Note that the processing unit 90 may obtain the rotation speed of the rotating disk 20 by counting one rotation data of the magnetic detection unit 80.

Then, similar processing to the above-described processing of S203 is performed (S408).

Figure 5:
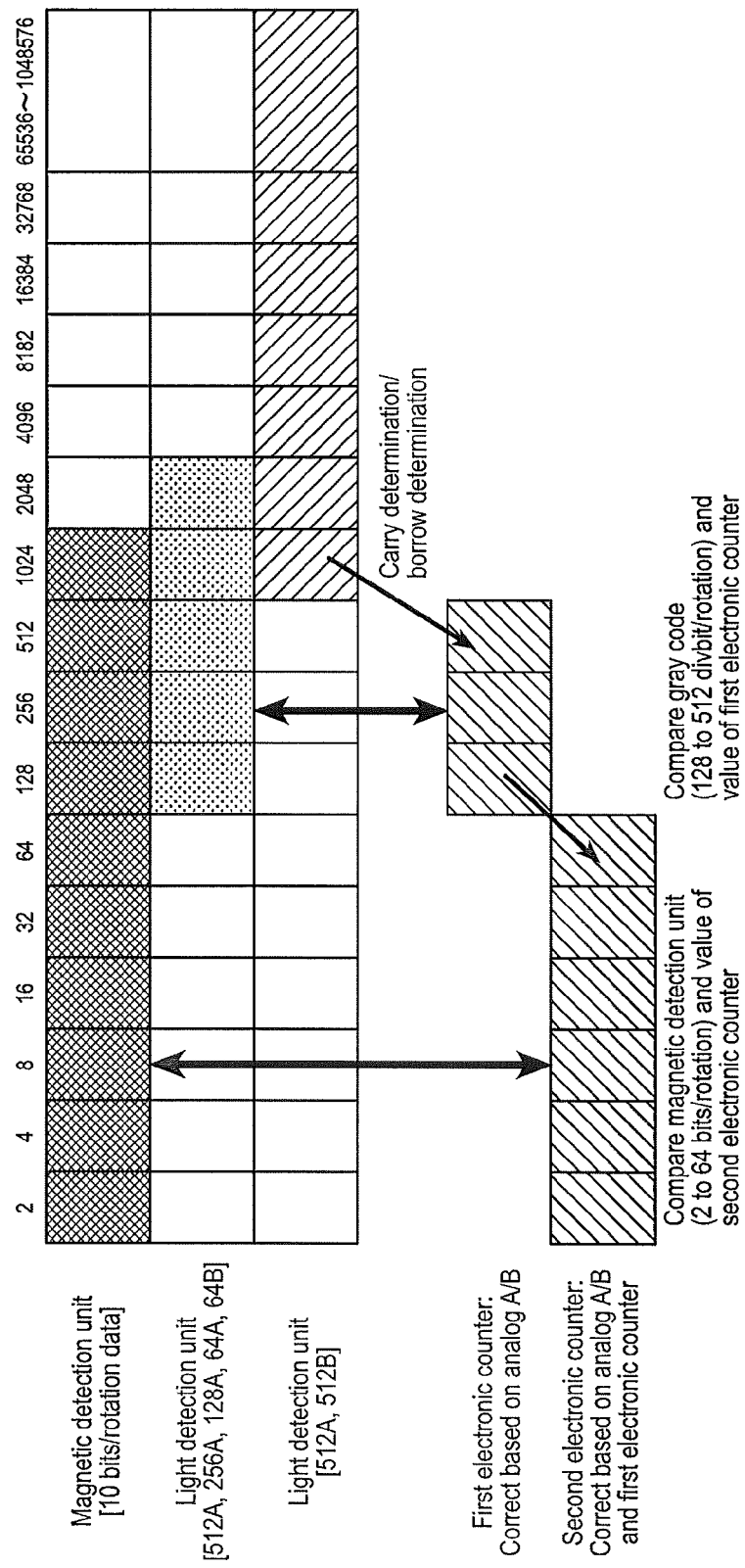
FIG. 5 is an explanatory diagram illustrating processing in the processing unit of the present embodiment.

Next, data processing in the processing unit 90 will be described with reference to FIG. 5. FIG. 5 is an explanatory diagram illustrating processing in the processing unit of the present embodiment.

As illustrated in FIGS. 1, 4, and 5, first, at the time of startup, a region of 128 to 512 division/rotation of the Gray code digital data of the light detection unit 60 corrected with the digital data calculated from the sine-wave analog data A/B is set as an initial value of the first electronic counter 91. Further, a region of 2 to 64 division/rotation of the digital data of the magnetic detection unit 80 corrected with the corrected Gray code digital data of the light detection unit 60 is set as an initial value of the second electronic counter 92.

In normal operation, first, the processing unit 90 compares previous data and current data in the sine-wave analog data A/B in a region of 1024 division/rotation or more, and when there is carry/borrow, the processing unit 90 renews the values of the first electronic counter 91 and the second electronic counter 92.

Next, the processing unit 90 compares the Gray code digital data of the light detection unit 60 and the value of the first electronic counter 91 in the region from 128 to 512 division/rotation. That is, the processing unit 90 compares the Gray code digital data of the light detection unit 60 and the value of the first electronic counter 91, and detects whether there is an error. When there is an error, the processing unit 90 outputs information about the error outside.

Following that, the processing unit 90 compares the digital data of the magnetic detection unit 80 and the value of the second electronic counter 92 in the region from 2 to 64 division/rotation. That is, the processing unit 90 compares the digital data of the magnetic detection unit 80 and the value of the second electronic counter 92, and detects whether there is an error. When there is an error, the processing unit 90 outputs information about the error outside.

As described above, basically, the encoder 100 of the present embodiment obtains the rotation angle (absolute angle) of the rotating disk 20 using the digital data of the Gray codes and the binary code output from the light detection unit 60 and the magnetic detection unit 80. The sine-wave analog data output from the light detection unit 60 is considered to enhance the detection accuracy of the rotation angle. Therefore, the digital data of the Gray codes and the binary code do not need an analog-digital conversion circuit, and therefore, the device cost of the encoder 100 can be reduced.

Further, the encoder 100 of the present embodiment compares the digital data of the binary code output from the magnetic detection unit 80, the sine-wave analog data and the digital data of the Gray code output from the light detection unit 60, and corrects a detection error of the rotation angle of the rotating disk. Therefore, according to the present embodiment, an absolute encoder 100 having highly reliable detection accuracy can be realized.

As described above, a preferred embodiment of the present invention has been described. However, the embodiment is a mere example for describing the present invention, and it is not intended that the scope of the present invention is limited to the embodiment. The present invention may be implemented in various forms different from the above-described embodiment without departing from the scope of the invention.

For example, in the above-described embodiment, the light-transmitting/shielding member 40 is formed as a fixed mask and is arranged at the side of the light source 50 of the rotating disk 20. However, the fixed mask may be arranged at the side of the light detection unit 60 of the rotating disk 20. Further, the light-transmitting/shielding member 40 may be built in the light detection unit 60 and integrally formed with the light detection unit 60.

What is claimed is:

1. An encoder comprising:
   a rotating disk, on which a plurality of Gray code optical patterns having a light-transmitting portion and a light-shielding portion alternately in a rotation direction is formed in a radial direction;
   a light-transmitting/shielding member, on which an optical pattern having a light-transmitting portion and a light-shielding portion, and facing each of the Gray code optical patterns on the rotating disk is formed;
   a light source adapted to irradiate the Gray code optical patterns on the rotating disk and the optical pattern of the light-transmitting/shielding member with light;
   a light detection unit adapted to receive the light transmitted through the light-transmitting portions of the rotating disk and the light-transmitting/shielding member, and to output digital data in accordance with a rotation position of the rotating disk;
   a magnet provided on a rotation center portion of the rotating disk, and forming a magnetic pattern by an arrangement of a magnetic pole;
   a magnetic detection unit adapted to detect the magnetic pattern, and to output digital data in accordance with the rotation position of the rotating disk; and
   a processing unit adapted to obtain a rotation angle of the rotating disk using the digital data of the magnetic detection unit and the light detection unit, wherein the processing unit corrects the digital data of the magnetic detection unit based on the digital data of the light detection unit.

2. The encoder according to claim 1, wherein the light-transmitting/shielding member is a fixed mask facing a disk surface of the rotating disk with a space.

3. The encoder according to claim 1, wherein the light-transmitting/shielding member is integrally formed with the light detection unit.

4. The encoder according to claim 1, wherein the light detection unit has divided light receiving units, and the light receiving units output digital data of a plurality of Gray codes of bit/rotation having different cycles in one rotation of the rotating disk, and the magnetic detection unit outputs digital data.

5. The encoder according to claim 4, wherein the processing unit compares the digital data of the detection units, and corrects the digital data of the light detection unit.

6. The encoder according to claim 1, wherein the processing unit obtains a rotation speed of the rotating disk by counting one rotation data of the magnetic detection unit.

7. The encoder according to claim 1, wherein the light detection unit receives the light transmitted through the light-transmitting portions of the rotating disk and the light-transmitting/shielding member during rotation of the rotating disk to output sine-wave analog data, and the processing unit refers to the analog data output from the light detection unit to correct a detection error, and obtains a rotation angle of the rotating disk.

8. An encoder according to claim 7, wherein the processing unit performs carry determination or borrow determination based on the sine-wave analog data, and obtains the rotation speed of the rotating disk.

* * * * *